Figure 1:
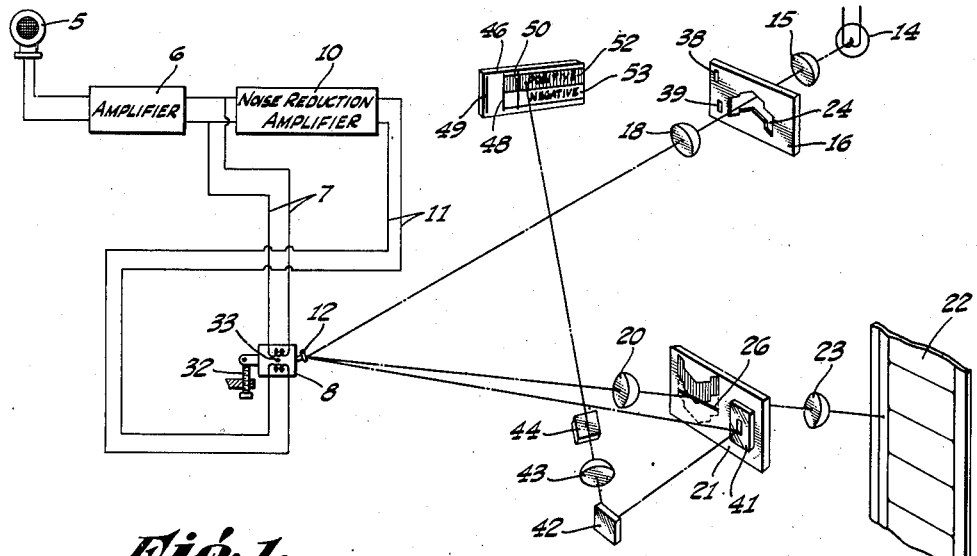

April 26, 1949.  A. R. ULMER  2,468,142

SOUND RECORDING SYSTEM AND APERTURE

Filed Dec. 22, 1945

ALFRED R. ULMER,
INVENTOR.

BY *Url R. Goshaw*

ATTORNEY.

Patented Apr. 26, 1949

2,468,142

UNITED STATES PATENT OFFICE 2,468,142

SOUND RECORDING SYSTEM AND APERTURE

Alfred R. Ulmer, Dumont, N. J., assignor to Radio Corporation of America, a corporation of Delaware Application December 22, 1945, Serial No. 636,968

6 Claims. (Cl. 179—100.3)

This invention relates to sound recording equipment, and particularly to a method of and means for recording either a negative or a direct positive sound record with the same recorder.

In Dimmick U. S. Patent No. 2,311,159 of February 16, 1943, a method of and means for recording a direct positive type of sound record is disclosed and claimed. This patent describes a system wherein the light is so impressed on the film that after the normal development thereof, the track or record is in the form produced by printing from the usual negative. There are many advantages in the direct recording of such a record without going through the printing operation step, as pointed out in the above-mentioned patent. There are also advantages in the recording of a negative, and the present invention discloses a system whereby the recorder can be very rapidly adjusted so that it will record either a negative or a direct positive record, according to the setting of the modulating element.

In Dimmick U. S. application, Ser. No. 629,294, filed November 17, 1945, a combination negative and direct positive recording system has been disclosed and claimed, this Dimmick system utilizing a chevron-shaped aperture and a plurality of slits in the slit mask, the modulating element, such as a galvanometer, being adjustable to impress the light beam at either of two positions on the slits, these positions determining whether or not the system will record a negative or a direct positive record.

The present invention is directed to a recording system of this type, but one wherein, by a novel-shaped aperture, only a single slit in the slit mask is necessary instead of the plurality of slits. The same indicating monitor system may be used as disclosed and claimed in Dimmick U. S. application, Ser. No. 629,295, filed November 17, 1945.

The principal object of the invention, therefore, is to facilitate the recording of film sound records.

Another object of the invention is to provide an improved recording method for the production of either negative or direct positive sound tracks.

A further object of the invention is to provide an improved system for recording either a negative or a direct positive sound track.

A still further object of the invention is to provide a sound recording system which may be changed from a negative recording to a direct positive recording system, or vice versa, with a minimum modification of the system.

A still further object of the invention is to provide an improved recording mask aperture which permits the recording of either a negative record or a direct positive record.

Figure 2:
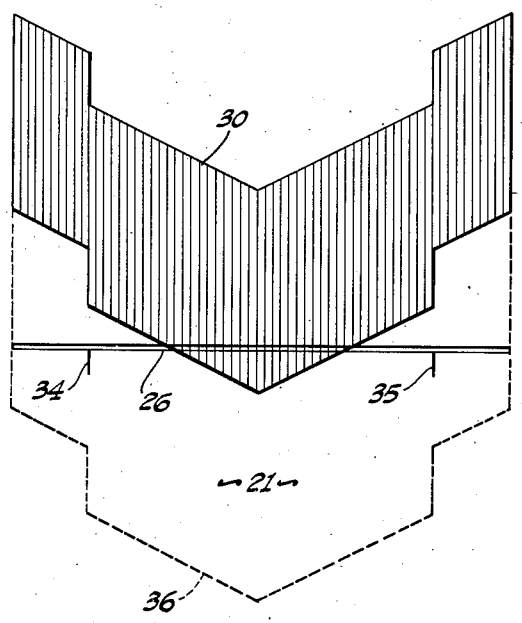

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 1 is a diagrammatic view of a recording system embodying the invention; and Fig. 2 is a view of the slit mask of Fig. 1 showing the light beam superimposed thereon in negative recording position.

Referring now to the drawings, in which the same numerals refer to like elements, the output of a microphone 5 is fed into an amplifier 6, and then directly over conductors 7 to a galvanometer 8. The output of amplifier 6 is also fed to a noise reduction amplifier 10, and then over conductors 11 to the galvanometer 8, it being well understood that the galvanometer mirror 12 is vibrated both in accordance with the instantaneous values of the sound waves and the envelope or average value of the sound waves. The remaining portion of the recording system includes a light source 14, a collecting lens 15, a mask plate 16, and a lens 18, together with a lens 20, a slit mask plate 21, a lens 23, and a film 22. In such a system, light from the lamp 14 is formed into a light beam shaped by the aperture 24 in the mask 16, then projected on the mirror 12 of the galvanometer 8 from which it is reflected to the slit mask 21, the light emerging through a slit 26 being impressed on the film 22, as will be described hereinafter.

Referring now to Fig. 2, an elevational view of the slit mask 21, with a single slit 26 therein, is shown with a light beam 30 in shaded lines positioned thereon for recording a negative record. The light beam 30 may be so positioned by adjustment of the galvanometer 8 on the pivot 33 with the hand screw 32. This position corresponds to a fifty percent modulation point, and is the rest position before noise reduction is applied. By turning the screw 32, the galvanometer may be rotated slightly so that the rest position of the light beam 30 is as shown by the dotted lines 36, at which position a direct positive record will be recorded.

In the above-identified Dimmick application, Ser. No. 629,294, filed November 17, 1945, the manner and means of producing the different types of records are explained in detail. It will be noted that the shape of this aperture differs from that shown by Dimmick in that at the points or lines indicated at 34 and 35 along the slit 26, the lower edges of the beam are made parallel with the vibration of the light beam, or perpendicular to the slit, and are then continued outwardly parallel with the lower edges of the aperture. The upper edge of the aperture or light beam corresponds to the lower edge. The lines 34 and 35 permit the proper longitudinal aligning of the light beam along the slit.

As pointed out in the Dimmick application, the no-signal position of the light beam 30 on the slit would be such that only the tip portion of the beam passes through the slit to provide the usual bias line. The light beam is then vibrated by both the instantaneous values and the average values of the sound waves being recorded, the average position of the beam with respect to the slit being moved downwardly in accordance with the amplitude of the sound waves. Thus, at one hundred percent modulation, the light beam would vibrate between the points 34 and 35 on the slit 26, and would extend no further even at overloads of approximately one hundred percent because of the length of the sides of the aperture parallel with the direction of vibration of the light beam. It is obvious that the light striking the film with this type of modulation would produce the usual bilateral negative record, since the central exposed portions of the film would be opaque and the remainder, transparent.

Now, if the galvanometer is adjusted or rotated by the screw 32 so that the light beam assumes the position shown by the dotted lines 36, light will pass through the ends of the slit and over its entire length, except for fifty percent of the distance between points 34 and 35. Now, when noise reduction is applied, light will pass through the entire length of the slit, except for a narrow section at the center, to form the bias line. Thus, as far as densities and types of records are concerned, the results are the same with the present type of aperture with a single slit as with the Dimmick system employing a pair of offset slits to get the additional exposure for the direct positive record. As in the Dimmick system, the application of noise reduction is in the same direction and of the same amount regardless of the type of record being recorded. The present aperture is simple to construct, and avoids the making of multiple slits.

Referring again to Fig. 1, it will be noted that in the mask 16, two vertically elongated apertures 38 and 39 are shown. Light from either one of these apertures according to the position of the galvanometer 8 will be reflected by a mirror 41 on the slit mask 21 to a mirror 42, then upwardly through a projection lens 43 to a mirror 44, and then to a monitor card 46. Because of the reflections, the images of these apertures will be horizontal, as shown by the rectangles 52 and 53. On the card 46, is a line 48 to indicate fifty percent modulation of the light beam, and lines 49 and 50 to indicate one hundred percent modulation, the rectangular beams of light moving horizontally with the vibrations of mirror 12. When the galvanometer 8 is adjusted so that the light beam is in the position shown at 30 in Fig. 2, the rectangle 53 will be illuminated, and when the light beam is in the position shown by the dotted lines 35 in Fig. 2, the rectangle shown in the dotted lines 52 will be illuminated. In the rectangle 52, the word "positive" is printed, and in the rectangle 53, the word "negative" is printed. Thus, the operator not only will be able to adjust the bias of the system and observe the extent of modulation during recording, but will be able to observe whether the system is adjusted to record a direct positive record or a negative record. This monitoring system is disclosed and claimed in Dimmick copending U. S. application, Ser. No. 629,295, filed November 17, 1945.

I claim:

1. A sound recording system adapted to record either a negative or a direct positive sound record comprising a slit mask having a slit therein for passing light to a film in accordance with the position of a light beam on said slit mask an aperture mask having an aperture adapted to form light into a chevron-shaped beam having symmetrically receding sides, said receding sides being broken at predetermined points from the apex of said chevron, the receding sides at said broken points being connected by sides perpendicular to said slit, means for vibrating said beam parallel with the direction of said sides and perpendicular to said slit, and means for adjusting said vibrating means to position said beam on said slit mask so that the maximum light passing through said slit extends only over a length of said slit corresponding to the perpendicular distance between said sides perpendicular to said slit.

2. A sound recording system adapted to record either a negative or a direct positive sound record comprising a slit mask having a slit therein for passing light to a film in accordance with the position of a light beam on said slit mask, an aperture mask adapted to form light into a chevron-shaped beam having symmetrically receding sides said receding sides being broken at predetermined points from the apex of said chevron, the receding sides at said broken points being connected by sides perpendicular to said slit, means for vibrating said beam parallel with the direction of said sides and perpendicular to said slit, and means for adjusting said vibrating means to position said beam on said slit mask so light passes through the end portions of said slit up to said broken points at all times during vibration of said beam.

3. A sound recording system comprising a light source, an aperture mask, vibrating means for a light beam formed by said aperture mask, a slit mask having a slit for passing light to a film in accordance with the position of said light beam on said slit mask, and means for adjusting said vibrating means to position said light beam on said slit mask in either of two positions, said aperture mask forming said light into a symmetrical chevron-shaped beam having receding upper and lower sides over the full width of said beam, said sides being broken at a predetermined distance from the apex of said sides and connected by sides perpendicular to said slit.

4. An aperture mask in a sound recording system, said mask having an aperture therein for forming light into a beam symmetrical about a vertical axis, said beam having two sides parallel with said vertical axis and top and bottom edges sloping rearwardly over a predetermined distance, then two sides parallel with said first two sides, and then the top and bottom edges continuing rearwardly with a slope parallel to that of the first top and bottom edges of said beam.

5. A sound recording system comprising a light source, an aperture mask, means for vibrating said light beam passing through the aperture in said mask, a slit mask having a single slit therein for passing light to film in accordance with the position of said light beam on said slit mask, said beam having a chevron shape with outer ends perpendicular to said slit and separated by a distance equal to the length of said slit, the upper and lower edges of said beam being at an angle to said slit and broken near the ends of said beam, said broken edges being joined by ends perpendicular to said slit, and means for adjusting said light beam on said slit mask so that only a portion of the lower edges of said light beam intersects said slit during the vibration of said light beam by said vibrating means.

6. A sound recording system comprising a light source, an aperture mask, means for vibrating said light beam passing through the aperture in said mask, a slit mask having a single slit therein for passing light to film in accordance with the position of said light beam on said slit mask, said beam having a chevron shape with outer ends perpendicular to said slit and separated by a distance equal to the length of said slit, the upper and lower edges of said beam being at an angle to said slit and broken near the ends of said beam, said broken edges being joined by ends perpendicular to said slit, and means for adjusting said light beam on said slit mask so that only a predetermined portion of the upper edges of said beam intersects said slit during vibration of said light beam by said vibrating means.

ALFRED R. ULMER.

REFERENCES CITED

The following references are of record in the file of this patent:

UNITED STATES PATENTS

| Number | Name | Date |
|---|---|---|
| 1,940,858 | Hanna | Dec. 26, 1933 |